United States Patent [19]

Jacobs

[11] 4,434,925
[45] Mar. 6, 1984

[54] STRIP SOLDER FEEDING AND RE-WINDING DEVICE

[76] Inventor: Joseph M. Jacobs, 212 Via LaCircula, Redono Beach, Calif. 90277

[21] Appl. No.: 241,602

[22] Filed: Mar. 9, 1981

[51] Int. Cl.³ .................. B23K 3/02; B65H 17/26; B65H 75/00
[52] U.S. Cl. ...................... 226/127; 228/53; 242/54 R
[58] Field of Search ............ 242/54 R, 54 A, 7.18; 226/127, 155, 152, 188; 228/51, 52, 53; 112/279

[56] References Cited

U.S. PATENT DOCUMENTS

| | | | |
|---|---|---|---|
| 2,424,413 | 7/1947 | Nelson | 242/54 R X |
| 3,521,804 | 7/1970 | Jacobs | 228/52 |
| 3,792,228 | 2/1974 | Wei-Cheng | 226/127 |
| 3,824,371 | 7/1974 | Schurman | 226/127 |
| 4,117,789 | 10/1978 | Rovin | 112/279 |
| 4,138,048 | 2/1979 | Lemmon | 228/152 |
| 4,216,733 | 8/1980 | Kornatowski | 112/279 |

Primary Examiner—Stuart S. Levy
Assistant Examiner—Lloyd D. Doigan
Attorney, Agent, or Firm—Gerald M. Newman

[57] ABSTRACT

A motorized strip solder feeding device including a spool of strip solder which may be mounted on a soldering iron for selectively feeding strip solder to the heated tip. When the strip solder on the spool is depleted, the spool may be mechanically connected to the motor to automatically renew the solder supply. The mechanical connection between the motor and spool is formed by a short length of solder.

6 Claims, 4 Drawing Figures

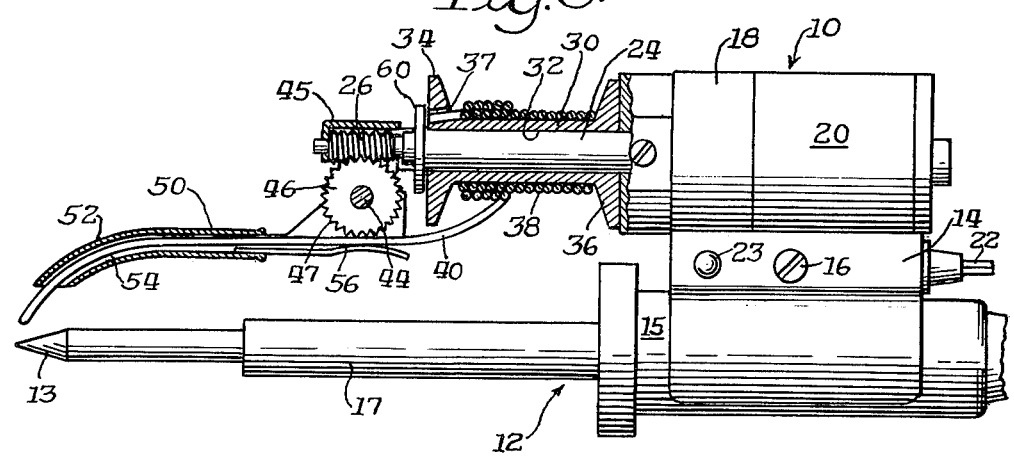
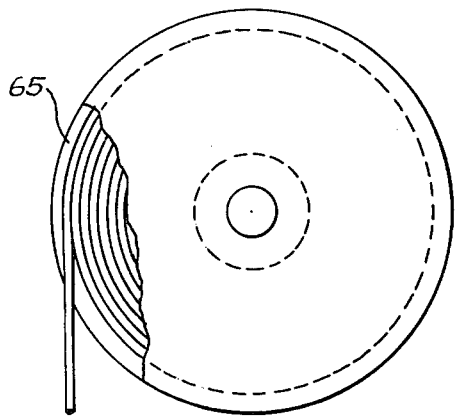
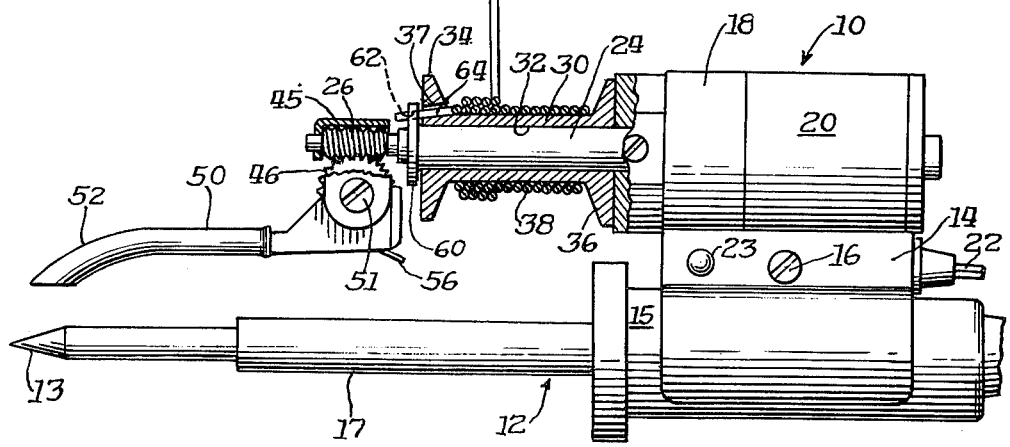

STRIP SOLDER FEEDING AND RE-WINDING DEVICE

SUMMARY OF THE INVENTION

This invention relates in general to soldering devices and more particularly to semi-automatic strip solder feeding devices for feeding strip solder to the heated tip of a soldering implement. More specifically, this invention relates to semi-automatic solder feeding devices having an integral supply of solder which may be mounted on a hand-held soldering iron for the purpose of feeding strip solder to the heated tip and which also has facility for renewing the solder supply in a quick and economical manner.

Semi-automatic solder feeding devices for feeding strip solder to the heated tip of a hand-held soldering iron are well-known in the art. Such devices, some of which may be integral with the soldering iron and others of which may be selectively attached to the iron, enable the user with one hand to simultaneously hold the soldering iron and feed the strip solder to the heated tip and the junction to be soldered, while supporting the work piece to be soldered with the other hand. While such solder feeding devices are not new in the art, all prior art devices have one or more major drawbacks and deficiencies which the instant invention overcomes.

Some devices feed the strip solder from a large, bulky source which may rest on the work table or adjacent shelf, through a flexible tube connecting the source to the iron. The flexible tube is in addition to the electrical power cord. Solder is drawn from the source through the tube and toward the heated tip. Such structure is unwieldy, restrictive and cumbersome to use as well as being expensive to manufacture.

Other semi-automatic solder feeding devices include small spools of solder which are pre-wound, mounted on the solder feeding device and manually threaded through the device. One such spool is shown in my disclosure set forth in U.S. Pat. No. 3,521,804 wherein a separate, non-renewable strip solder spool is incorporated. When the spool of solder is depleted, either the old spool must be discarded and a new spool installed or the operator must manually wind a new supply of solder onto the existing spool. Such manual operation takes time and is extremely inconvenient thereby resulting in wasted effort and great expense.

The semi-automatic solder feeding device of the instant invention overcomes many of the deficiencies, problems and inadequacies of prior art devices by providing a small, compact motor driven solder feeding device which may be mounted on soldering irons of various sizes and weights and is easily manufactured while at the same time being very reliable. The feeding device of the invention provides precise control for feeding the exact quantity of solder to the heated tip. The solder is stored on and fed from a solder supply spool which is integral with the solder feeding device and, most importantly, in accordance with the invention when the strip solder supply on the spool is depleted, it may be quickly renewed utilizing the feed drive motor and a novel mechanical connection formed by the strip solder itself.

In accordance with the invention, the solder feeding device is constructed to be attached to a soldering iron in a manner such that the strip solder may be fed to the heated tip. The semi-automatic feeding device includes a switched electric motor which may be energized to feed solder from the spool to the heated tip. When the solder on the spool is depleted, the motor may be mechanically connected to the spool through a novel connection utilizing the strip solder. When the motor is then energized, it rotates the spool enabling a new supply of solder from a large source to be wound onto the empty supply spool.

Accordingly, it is an object of this invention to provide a semi-automatic solder feeding device of simple and straightforward design for feeding strip solder to the heated tip of a soldering iron.

Another object of this invention is to provide a motor driven, switch actuated semi-automatic strip solder feeding device which may be mounted on soldering irons of various styles and types for feeding strip solder to the heated tip.

A further object of this invention is to provide a solder feeding device carrying an integral solder supply which may be conveniently, quickly and inexpensively replenished from a larger source.

A still further object to this invention is to provide a semi-automatic strip solder feeding device which enables the user to utilize a large, inexpensive bulk source of strip solder while maintaining maximum mobility and utility of the soldering iron and feeding device and thus control over the object being soldered.

A unique feature of this invention resides in the novel connection of the electric motor to the spool when it is desired to rotate the spool to replenish the solder supply.

Other objects of this invention will become apparent upon an examination of the following description taken in conjunction with the accompanying drawings wherein:

FIG. 3 is a side elevational sectional view taken along line 3—3 of FIG. 2. showing the spool construction and the driving connection between the motor, shaft and gears.

FIG. 4 is an elevational sectional view similar to that shown in FIG. 3. illustrating the bulk solder supply and the novel mechanical connection between the motor and the spool when renewing the solder supply on the spool.

Figure 1:
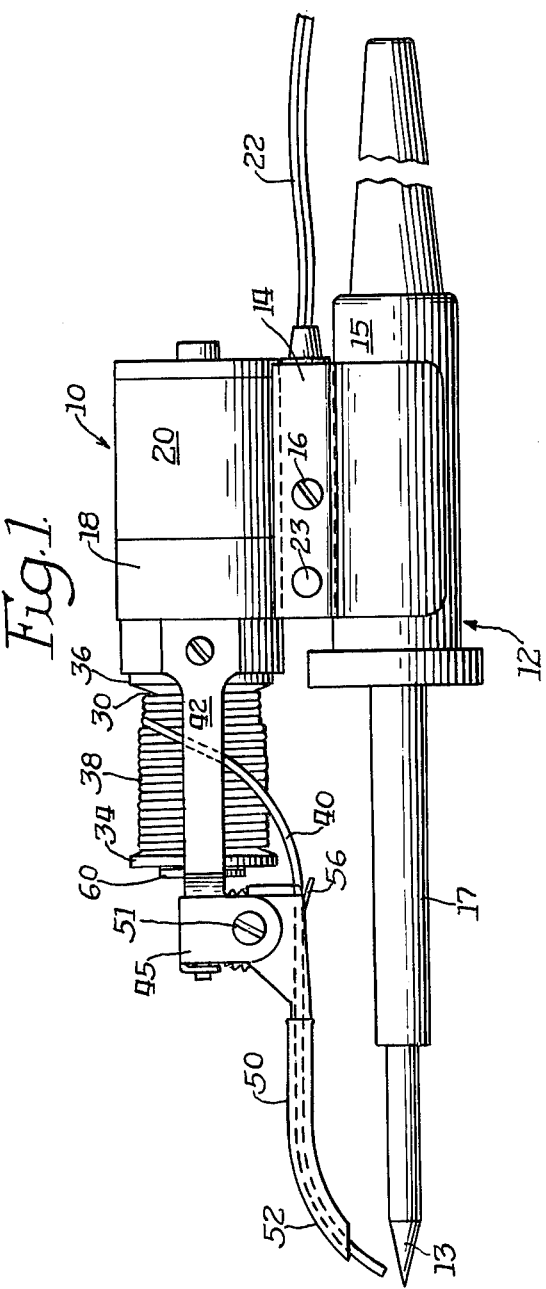
FIG. 1 is a side elevational view of the semi-automatic strip solder feeding device of the invention mounted on a soldering iron.
Figure 2:
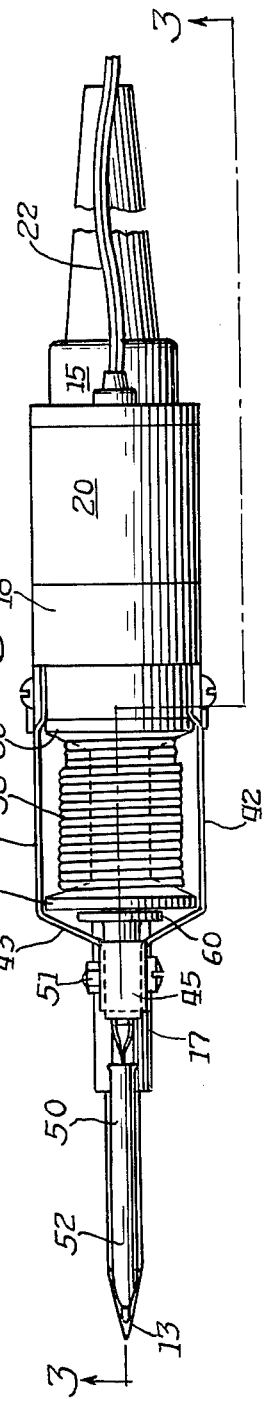
FIG. 2 is a top plan view of the solder feeding device of the invention mounted on a soldering iron.

Referring more particularly to the drawings, there is shown in FIG. 1. an improved solder feeding apparatus, generally referred to by reference numeral 10 mounted on a soldering iron 12 by means of a clamp 14 secured by a screw 16. The soldering iron includes an insulated handle 15 which supports a heating element 17 to heat a tip 13 to a temperature sufficiently high to melt conventional strip solder.

By means of the threaded fastener, the solder feeding device may be securely clamped onto the handle of the soldering iron and may be adjusted longitudinally so it may be positioned approximately at the combined center of gravity of the iron and feeding device. The solder feeding device may also be removed and attached to different soldering irons for instance in the event one iron burns out or a higher or lower wattage soldering iron is required.

Clamp 14 supports a frame 18 which in turn supports an electric motor 20. The motor is energized through an electric cord 22 and a push button switch 23 which is conveniently located adjacent to the handle so as to be operated by the thumb when cradling the soldering iron in a manner similar to holding a pencil.

Motor 20 includes a rotating shaft 24 which extends from the front of the motor and which has a worm gear 26 secured to its end. Shaft 24 also carries a solder supply spool 30 which defines a center opening 32 along its longitudinal axis. The spool includes a front wall 34 and back wall 36 and has a shape similar to an ordinary spool used for sewing thread. Front wall 34 defines an aperture 37 which extends generally horizontally through the entire wall thickness.

Spool 30 is normally carried on shaft 24 in a free wheeling manner, the shaft serving as a bearing support for the spool rotation. The spool carries a supply of strip solder 38, one end 40 of which may be selectively drawn off and fed to the heated tip of the soldering iron in a manner as will be described hereafter.

Frame 18 also includes a pair of generally parallel arms 42 extending forwardly of the motor and bending inwardly toward each other at 43. Arms 42 support a "U" shaped strap 45 which carries a short horizontally oriented axle 44 which is perpendicular to motor shaft 24 and positioned underneath the shaft. Axle 44 serves as a bearing for a gear 46, having sharp teeth 47 which mesh with worm gear 26 so that upon energization of motor 10 and rotation of worm gear 26, the toothed gear is appropriately driven. Frame 18 also supports a guide 50 which is secured below the toothed gear by nut and bolt 51 which forms axle 44 and includes a curved nose section 52, and a passageway 54 through which the solder is fed and guided to heated tip 13. The guide may be pivoted about the nut and bolt so that the solder outlet is directed at the heated tip as desired. The bottom wall of guide 50 includes a spring biased member 56 which urges the strip solder 40 towards and into firm engagement with teeth 47 of gear 46.

The free end 40 of the strip solder supply is thus fed through the passageway formed by the spring biased member 56 and the toothed gear 46 into the guide 50 and is then directed downwardly by curved end 52 towards tip 13 of the soldering iron. Energization of motor 20 rotates worm gear 26 which drives toothed gear 46 thereby automatically feeding the strip solder to the hot tip.

A flat, washer-like element 60 is permanently secured to shaft 24 between the outer edge of spool wall 34 and the worm gear 26. Washer 60 thus provides a stop for solder spool 30 thereby maintaining the solder spool in proper longitudinal position on motor shaft 24.

Washer 60 includes a horizontal aperture or hole 62 which is located so that by rotating the spool, aperture 37 of the spool wall may be aligned with washer aperture 62. The alignment of apertures 62 and 37 is important and a material part of the invention as will be hereinafter described.

When the coiled supply of strip solder becomes depleted from the spool, it is then necessary to renew said coiled supply from a larger bulk spool of solder which can be purchased economically and may be kept on the work bench. This can be simply accomplished by aligning spool aperture 37 with washer aperture 62, then inserting a free-end 64 from a large supply of strip solder 65 through both apertures 37 and 62. The strip solder forms a mechanical connection between the spool and the washer and thus between the spool and motor shaft 24 so that when the motor is energized the motor will rotate the spool rather than the spool being free-wheeling on shaft 24. Energization of the motor will allow a new supply of solder to be quickly wound on spool 30. A convenient rotation is about 130 revolutions per minute, thus the solder supply on the spool may be renewed in a very short time.

When the spool is filled, the loose end may be cut from the large supply and, by tightly holding the spool and simultaneously energizing the motor, the soft mechanical connection formed by the strip solder passing through the spool and the washer apertures can be easily broken thereby allowing the solder spool to once again rotate freely on shaft 24. The loose-end 40 may then be fed through the channel in engagement with the toothed gear 46. A short burst of energization of the motor will then feed the solder through channel 50 and toward the heated tip thereby placing the soldering iron and solder feeding device in operation for commencement of normal soldering operations.

What has been described is a semi-automatic solder feeding device which may be attached to various soldering irons and which includes a motorized method for quickly and economically replenishing the strip solder on to the spool after it has become depleted from use. This is in addition to a very controlled method for semi-automatically feeding strip solder toward the heated tip of a soldering iron.

It is obvious that upon study of those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are as follows:

1. Apparatus for feeding strip solder to the heated tip of a soldering iron comprising:
   a spool carrying a coiled supply of strip solder defining an opening along its longitudinal axis and having a front wall defining an aperture; a motor having a shaft extending through the spool opening and supporting said spool for free-wheeling rotation about said shaft;
   stop means secured to said shaft adjacent to the front wall and defining an aperture alignable with the spool wall aperture whereby a length of strip solder inserted through said aligned apertures mechanically connects the motor and the spool to wind a fresh coiled solder supply on to the spool.

2. The apparatus as set forth in claim 1 including a toothed gear engaging said strip solder; means for rotating the gear to pull the strip solder from the spool and means for guiding said solder toward the heated tip.

3. The apparatus as set forth in claim 2 wherein the engagement of the toothed gear with the solder automatically threads the solder through the guide and towards the heated tip.

4. In a strip solder feeding device for feeding strip solder to the heated tip of a soldering iron comprising a motor and a spool carrying a supply of strip solder, means for drawing said strip solder from said spool and feeding it to said heated tip and web means comprising a length of strip solder connecting said motor to said spool for rotating said spool to wind a fresh supply of strip solder thereon.

5. Apparatus for feeding strip solder to the heated tip of a soldering iron comprising:
- means for attachment to a soldering iron carrying a coiled supply of strip solder;
- a motor for selectively drawing strip solder from said coiled supply and moving it toward said tip; and
- a length of strip solder for connecting said motor to said coiled supply for selectively renewing said supply of strip solder by mechanically winding a fresh supply while attached to said soldering iron.

6. In a strip solder feeding device for feeding strip solder to the heated tip of a soldering iron comprising a motor including a shaft and a spool supported for rotation on said shaft carrying a supply of strip solder, said spool including a front wall defining an aperture; means for drawing said strip solder from said spool and feeding it to said heated tip and said motor shaft including means defining an aperture adjacent to and alignable with the spool wall aperture and wherein a length of strip solder inserted through both apertures forms a mechanical connection between the spool and motor to rotate said spool for winding a fresh supply of solder thereon.

* * * * *